United States Patent [19]

Inoue et al.

[11] Patent Number: 5,338,059
[45] Date of Patent: Aug. 16, 1994

[54] AIR BAG COVER INCLUDING HORN SWITCH

[75] Inventors: Michio Inoue; Tadashi Yamamoto; Hiroshi Ogawa, all of Inazawa, Japan

[73] Assignee: Toyoda Gosei Co., Ltd., Nishikasugai, Japan

[21] Appl. No.: 40,358

[22] Filed: Mar. 30, 1993

[30] Foreign Application Priority Data

Apr. 13, 1992 [JP] Japan .................................. 4-023248

[51] Int. Cl.⁵ ........................ B62D 1/04; B60R 21/20
[52] U.S. Cl. ........................ 280/728 B; 200/61.54
[58] Field of Search ........... 280/728 R, 728 A, 728 B, 280/731; 200/61.54, 61.55

[56] References Cited

U.S. PATENT DOCUMENTS

| | | | |
|---|---|---|---|
| 4,612,425 | 9/1986 | Kanai et al. | 200/61.55 |
| 4,714,806 | 12/1987 | Inui et al. | 200/61.55 |
| 5,002,306 | 3/1991 | Hiramitsu et al. | 280/731 |
| 5,062,661 | 11/1991 | Winget | 280/728 B |
| 5,198,629 | 3/1993 | Hayashi et al. | 280/731 |

FOREIGN PATENT DOCUMENTS 4-5171  1/1992  Japan .
4-43158  2/1992  Japan .

Primary Examiner—Karin L. Tyson
Attorney, Agent, or Firm—Cushman, Darby & Cushman

[57] ABSTRACT

A pad assembly for an air bag device is provided which has a horn switch, and is directed to readily ensure adequate operation load of a switch, to improve productivity and to preventing an increase in the thickness of the portion of the pad where the switch is located. A pad 10 for an air bag device M is disposed on a steering wheel W, has an upper wall 11 and a side wall 12 extending downward from the peripheral edge of the upper wall 11, and further includes a horn switch. The pad 10 includes a covering layer 14 made of a soft synthetic resin, a hard insert 15 embedded in the side wall 12 of the pad 10, and a pressure sensitive switch 18 having metal sheets 19, 20 and 21 which offer a shape-retaining property and functioning as the horn switch. The pressure sensitive switch 18 is disposed on a rear surface of the upper wall 11 of the pad 10 with end portions 19a, 20a and 21a thereof retained by the insert 15.

7 Claims, 4 Drawing Sheets

AIR BAG COVER INCLUDING HORN SWITCH

BACKGROUND OF THE INVENTION

1. Field of the Invention

The present invention relates to an air bag device which is disposed on a steering wheel and which has a pressure-sensitive type horn switch.

2. Description of the Prior Art

Pads for the above-described type of air bag device having a pressure-sensitive type horn switch are known. In Japanese Patent Unexamined Publication No. 4-43158, a pad in which a pressure sensitive switch is insert-formed in a covering layer has been described.

Japanese Utility Model Unexamined Publication No. 4-5171 discloses a pad in which a pressure sensitive switch is disposed between a covering layer and an insert when the covering layer and the insert, which have been formed separately, are joined to each other.

However, the former type of pad has a drawback in that it is difficult to provide an accurate operation load of the pressure sensitive switch because the switch is embedded in the covering layer when the layer is formed and is thus affected by the generated pressure of the covering layer.

In the latter pad, since the pressure sensitive switch is sandwiched between the covering layer and the insert, the portion of the pad where the pressure sensitive switch is disposed has a three-layer structure consisting of the covering layer, the pressure sensitive switch and the insert, increasing the thickness thereof. Also, since the pressure sensitive switch is hidden in the middle of the assembly operation, the positioning operation of the switch is troublesome, thus deteriorating productivity.

SUMMARY OF THE INVENTION

In view of the above-described problems of the conventional pad, an object of the present invention is to provide a pad for an air bag device having a horn switch which enables an adequate operation load of the switch to be readily secured, which assures an improvement in productivity, and which is capable of preventing an increase in the thickness of the portion of the pad where the switch is disposed.

To achieve the above-described object, the present invention provides a pad for an air bag device which is disposed on a steering wheel, having an upper wall and a side wall extending downward from the peripheral edge of the upper wall, and having a horn switch. The pad includes a covering layer made of a soft synthetic resin, a hard insert embedded in the side wall of the pad, and a pressure sensitive switch having a metal sheet which offers a shape-retaining property and which functions as the horn switch. The pressure sensitive switch is disposed on a rear surface of the upper wall of the pad with an end portion thereof retained by the insert.

The pad according to the present invention can be manufactured by forming a hard insert and a covering layer as one unit and then by retaining the end portion of the pressure sensitive switch, functioning as a horn switch, to the insert. That is, in the pad according to the present invention, since the pressure sensitive switch is not embedded as the insert when the covering layer is formed, it is not effected by the pressure generated by forming, and a predetermined operation load of the pressure sensitive switch can thus be secured reliably.

Furthermore, when the pressure sensitive switches are assembled, they are disposed on the rear surface of the upper wall of the pad and are not embedded in the insert. Thus, the pressure sensitive switches can be observed throughout the assembly operation. This makes positioning of the switches easy and thus simplifies the positioning operation.

Furthermore, since the pressure sensitive switch has a shape retaining property due to the provision of metal sheets, it is not necessary for a pad shape retaining insert to be provided on the portion of the pad where the pressure sensitive switch is provided. Therefore, an increase in the thickness of the portion of the pad where the pressure sensitive switch is disposed can be prevented.

Thus, the pad for an air bag device according to the present invention enables an adequate operation load of the switch to be readily secured, assures an improvement in productivity, and is capable of preventing an increase in the thickness of the portion of the pad where the switch is disposed.

DETAILED DESCRIPTION OF THE PREFERRED EMBODIMENTS

A first embodiment of the present invention will be described below with reference to the accompanying drawings.

Figure 1:
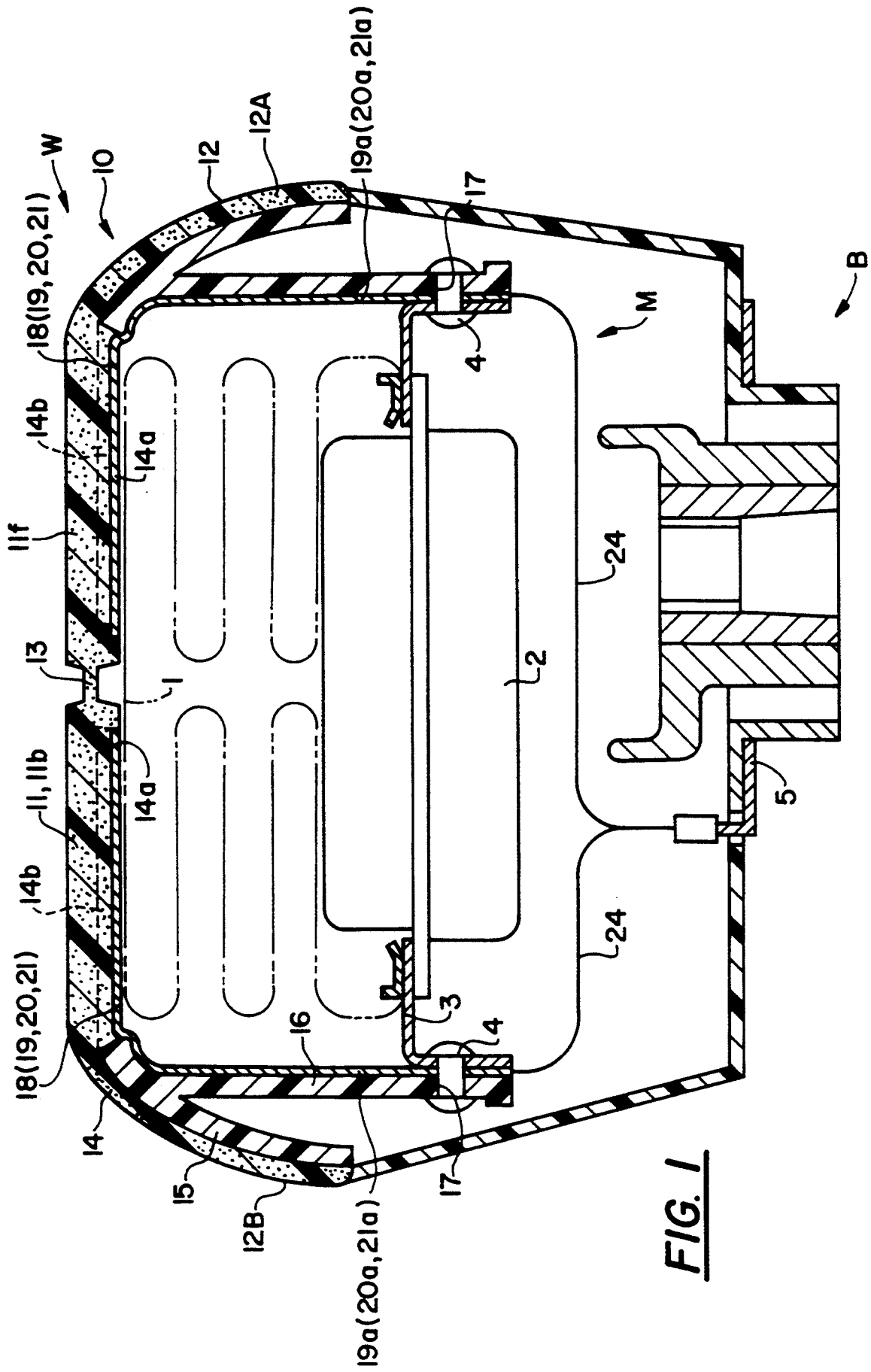
FIG. 1 is a cross-sectional view taken along the line I—I of FIG. 4, showing a first embodiment of the present invention.
Figure 2:
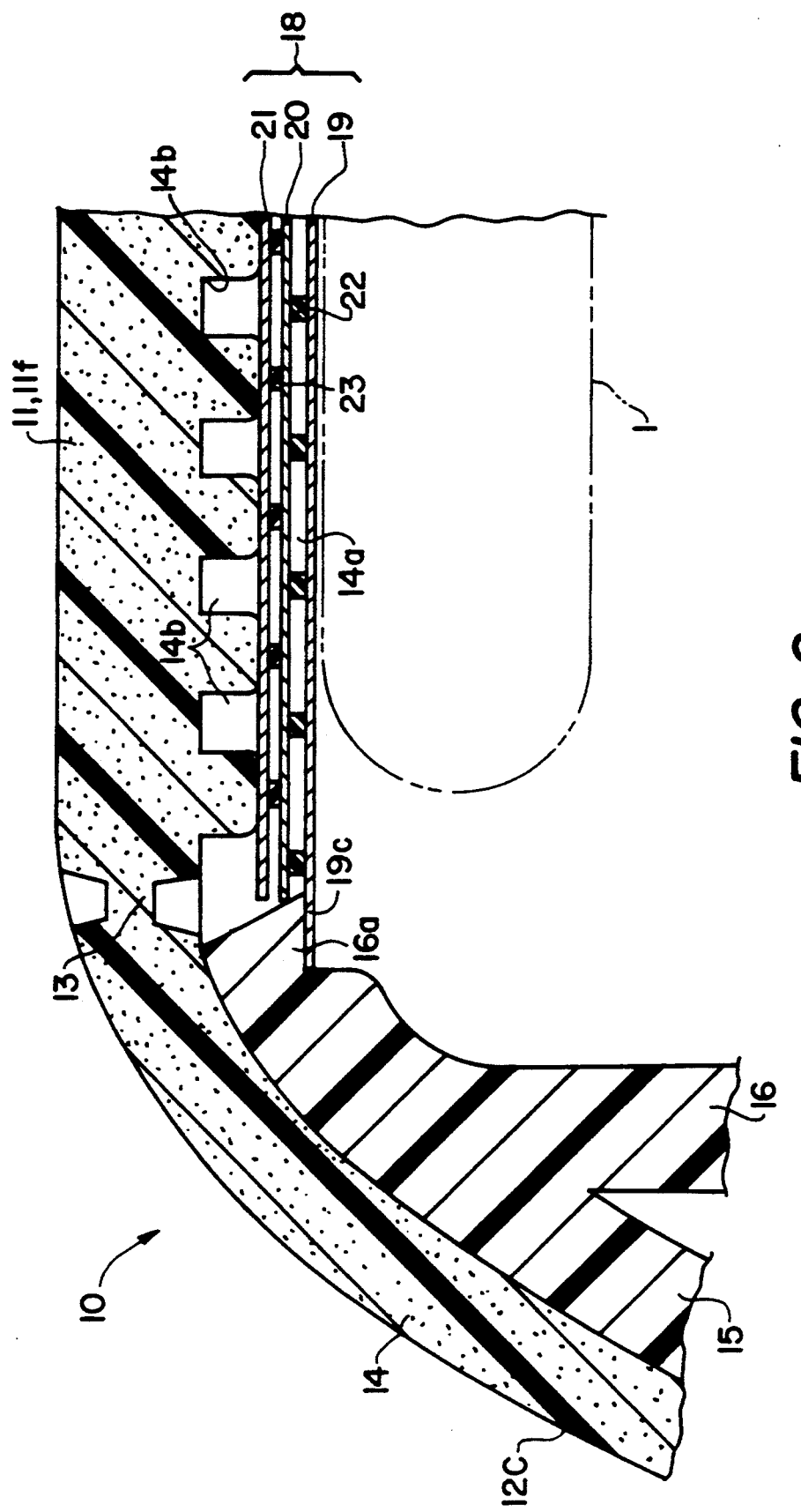
FIG. 2 is a cross-section taken along the line II—II of FIG. 4, showing another portion of the first embodiment of the invention.
Figure 4:
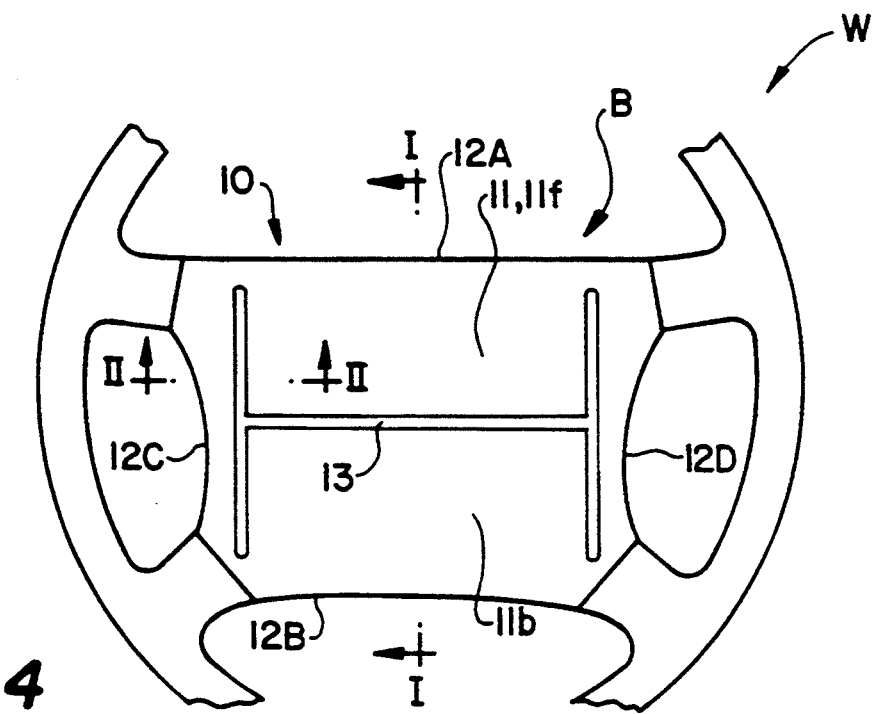
FIG. 4 is a plan view of a steering wheel on which a pad of the first embodiment of the invention has been assembled.

In this embodiment, a pad 10 is disposed in an upper portion of an air bag device M, as shown in FIGS. 1, 2 and 4. The air bag device M is disposed in an upper portion of a boss portion B of a steering wheel W. The pad 10 has a substantially square box-like shape which is made up of a substantially rectangular upper wall 11 and a side wall 12 which extends downward from the four side edges of the upper wall 11 (including 12A, 12B, 12C and 12D).

The air bag device M includes the pad 10, an air bag 1 which is folded and accommodated inside the pad 10, an inflator 2 for supplying gas into the air bag 1, and a holder 3 made of a metal plate for retaining the air bag 1, the inflater 2 and the pad 10. The air bag device M is mounted on the body of the steering wheel through a side portion (not shown) of the holder 3.

The pad 10 includes a covering layer 14, an insert 15 disposed on the side wall 12, a pair of shape-retaining type pressure sensitive switches 18 disposed on the rear surface of the upper wall 11 and functioning as horn switches.

The covering layer 14 is made of a soft synthetic resin, such as soft PVC, styrene type TPE (thermoplastic elastomer), olefin type TPE or soft urethane. In the portion of the covering layer 14 which forms the upper wall 11, a supposed rupture portion 13 having a thin wall is formed. When the air bag 1 is inflated, the supposed rupture portion 13 ruptures so that the upper wall 11 can be expanded with a front portion 11f and a rear portion 11b thereof opened as if they were hinged double doors. In each of the two portions of the rear surface of the upper wall 11 of the covering layer 14 which is surrounded by the rupture portion 13 in three directions thereof, recessed portions 14a, 14a are formed from a periphery thereof. In each of the recessed portions 14a, a plurality of recessed grooves 14b extend in alignment in the lateral direction of the pad 10.

The insert 15 has a substantially square tubular shape and is made of a hard, rigid synthetic resin, such as hard PP or hard PE. A mounting piece 16 extends downward from the inner peripheral surface of the insert 15 over the entire periphery thereof. In the vertical direction of the pad 10, the upper end of the insert 15 forms part of the peripheral wall of the recessed portion 14a of the covering layer 14. The mounting piece 16 has many mounting bores 17 therethrough by which the pad is retained to the holder 8 by means of rivets 4. At that time, the pressure sensitive switch 18 is tightened and retained to the insert 15 together with the pad 10.

The insert 15 may also be made of a metal plate, such as a steel plate or an aluminum plate.

Each of the pressure sensitive switches 18 includes a lower plate 19, a middle plate 20 and an upper plate 21 which are vertically stacked and made of metal having a shape which ensures that they can be fitted into the recessed portion 14a of the upper wall 11 of the pad 10, and a large number of supporting portions 22 and 23 made of rubber and disposed between the plates. The thickness of the pressure sensitive switch 18 is about 0.9 mm.

The lower plate 19 is preferably a stainless steel plate having a thickness of about 0.2 mm. The middle plate 20 is preferably a 0.1 mm-thick copper plate. The upper plate 21 is preferably a stainless steel plate of a thickness of 0.2 mm. The plates 19, 20 and 21 have tongue pieces 19a, 20a and 21a, respectively, at positions which are offset from each other. The tongue pieces 19a, 20a and 21a bend toward the side wall 12A or 12B and then extend downward. The tongue pieces 19a, 20a and 21a have mounting holes 19b, 20b and 21b formed at the distal end thereof, respectively. The pressure sensitive switch 18 is retained to the insert 15 by means of the rivets 4 by utilizing the mounting holes 19b, 20b and 21b.

Figure 3:
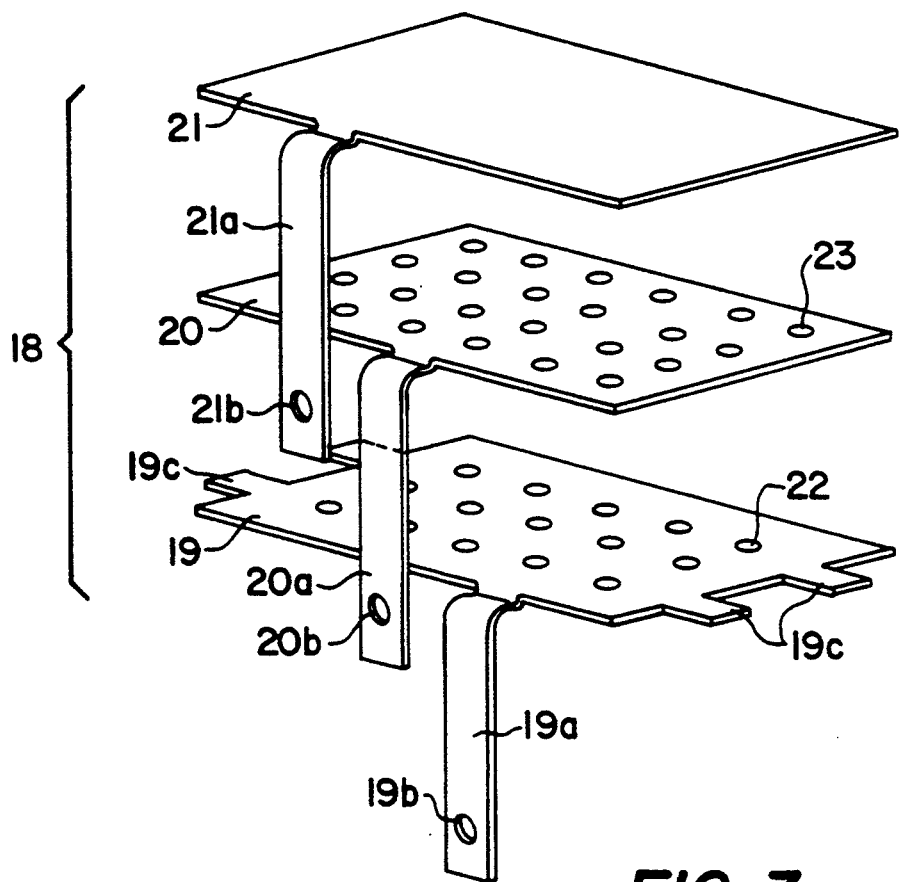
FIG. 3 is an exploded perspective view of a pressure sensitive switch of the first embodiment of the invention.

As shown in FIGS. 2 and 3, claw pieces 19c extend from the right and left edges of the lower plate 19 in the horizontal direction. The claw pieces 19c make contact with a step or shoulder portion 16a formed on the inner periphery of the upper portion of the mounting piece 16 when the pressure sensitive switch 18 has been retained to the insert 15. After the air bag device M has been assembled, the folded air bag 1 may be bulky due to variations in the height thereof. The claw pieces 19c have the function of pressing the bulky air bag 1 in order to secure the horn stroke of the pressure sensitive switch 18.

The supporting portions 22 disposed between the lower plate 19 and the middle plate 20 and the supporting portions 23 disposed between the middle plate 20 and the upper plate 21 are offset from each other so that they are not disposed on top of another.

The pressure sensitive switch 18 is manufactured by adhering or valcanizing the supporting portions 22 and 23 to the plates 19, 20 and 21.

The thus-arranged pad 10 will be manufactured in the manner described below. First, after the insert 15 has been formed, it is set in the forming die for the covering layer 14. In that state, the covering layer 14 is formed.

The two pressure sensitive switches 18 are fitted into the recessed portions 14a of the covering layer 14. At that time, the claw pieces 19c of each of the lower plates 19 are brought into contact with the shoulder portion 16a of the insert 15, and the mounting holes 19b, 20b and 21b are brought into alignment with the corresponding mounting holes 17 in the mounting piece 16 of the insert 15.

Thereafter, both the mounting piece 16 of the insert 15 and the tongue pieces 19a, 20a and 21a of each of the pressure sensitive switches 18 are mounted on the holder 3 with the folded air bag 1 and the inflater 2 retained thereon by utilizing the rivets 4 to manufacture the pad 10. Subsequently, the pad 10 is assembled on the air bag device M.

At that time, a terminal (not shown) of a lead 24 is also tightened by the rivet 4 around the mounting holes 19b and 21b of the lower plate 19 and the upper plate 21 in a state wherein it is electrically insulated from the holder 3, which is a metal plate, so as to connect the lead 24 to the tongue piece 19a of the lower plate 19 and to the tongue piece 21a of the upper plate 21.

The thus-assembled air bag device M is mounted on the body of the steering wheel W by utilizing the holder 3, and then that steering wheel W is mounted on a vehicle.

When the air bag device M is mounted on the body of the steering wheel W, the lead 24 is connected to a slip ring 5 which acts as a positive pole of a horn activating circuit provided on the lower surface of the steering wheel W. Regarding the middle plate 20, the holder 3 which is in contact with the tongue piece 20a is connected to a negative pole of the horn activating circuit through a core metal of the steering wheel W or the like therebetween when the steering wheel W is mounted on the vehicle.

After the mounting of the steering wheel W on the vehicle, when the front portion 11f or rear portion 11b of the upper wall 11 of the pad 10 is pressed, the middle plate 20 makes contact with the lower plate 19 or the upper plate 21, activating the horn. When the portion of the pressure sensitive switch 18 where each of the supporting portions 22 is disposed is pressed in the neighborhood thereof, the portion of the upper plate 21 which faces that portion of the pressure sensitive switch 18 is bent and makes contact with the middle plate 20. When the portion of the pressure sensitive switch 18 where each of the supporting portion 23 is disposed is pressed in the neighborhood thereof, the corresponding portion of the upper plate 21 and the corresponding portion of the middle plate 20 are bent, and the bent middle plate 20 makes contact with the lower plate 19 so as to activate the horn.

When the gas is supplied into the air bag 1 by the activation of the inflater 2, the supposed rupture portion 13 of the pad 10 ruptures, and the front portion 11f and the rear portion 11b of the upper wall 11 of the pad 10 are opened as if they were hinged double doors to greatly expand the air bag 1.

When the front portion 11f and the rear portion 11b are opened, the claw pieces 19c of each of the pressure sensitive switches 18 are bent while the portions of the tongue pieces 19a, 20a and 21a which are located close to the upper wall 11 are bent to make the pressure sensitive switch 18 follow the expanding operation.

In this embodiment, the pressure sensitive switch 18 is not embedded as an insert during the formation of the covering layer 14 but is assembled on the rear surface of the upper wall 11 after the covering layer 14 has been formed. Thus, the pressure sensitive switch 18 is not affected by the pressure generated during assembly, and a predetermined operation load of the pressure sensitive switch 18 can thus be ensured.

Furthermore, when the pressure sensitive switches 18 are assembled, they are disposed on the rear surface of the upper wall 11 of the pad 10 and are not hidden so as to be not embedded in the insert. Thus, they can be observed throughout the assembly operation, making positioning of the switches easy and thus simplifying the positioning operation.

Furthermore, since the pressure sensitive switch 18 has a shape retaining property due to the provision of the metal sheets 19, 20 and 21, it is not necessary for a pad shape retaining insert to be provided on the portion of the pad 10 where the pressure sensitive switch 18 is disposed. Thus, there is no need to increase the thickness of the portion of the pad 10 where the pressure sensitive switch 18 is disposed.

Figure 5:
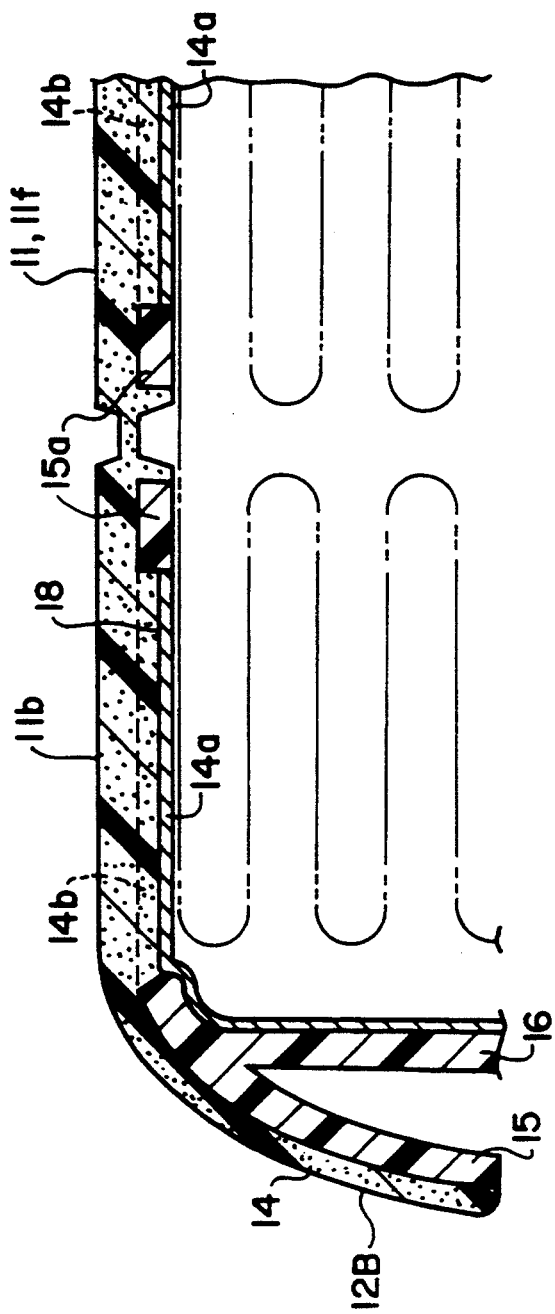
FIG. 5 is a cross-sectional view of a second embodiment of the present invention.

In this embodiment, since the recessed portions 14a are formed in the rear surface of the upper wall 11 of the covering layer 14 so as to allow the pressure sensitive switches 18 to be fitted thereinto during the assembly thereof, the assembly operation is facilitated more easily. In order to improve further the workability of the assembly operation, a frame 15a extending from the insert 15 may be formed over the entire periphery of each of the recessed portions 14a to a thickness which assures the opening of the front portion 11f and the rear portion 11b of the upper wall 11 in such a manner that it does not cross the supposed rupture portion 13, as shown in FIG. 5.

In this second embodiment, the pressure sensitive switch 18 having three metal sheets 19, 20 and 21 is used. However, a pressure sensitive switch having a lower plate 19, a middle plate 20 and a plurality of supporting portions 22 disposed between the lower plate 19 and the middle plate 20 may also be employed. In that case, the shape retaining property of the pressure sensitive switch is secured mainly by selecting the thickness of the lower plate 19.

Furthermore, in this embodiment, the end portions 19a, 20a and 21a of the pressure sensitive switch 18 are mounted on the mounting piece 16 of the insert 15 by utilizing the rivets 4 which are used to mount the pad 10 on the holder 3. However, the end portions 19a, 20a and 21a may be mounted on the other portion of the mounting piece 16 by utilizing a screw of the like so as to allow the pressure sensitive switch 18 to be retained to the insert 15.

It has thus been seen that the objects of the invention have been fully and effectively accomplished. It will be realized, however, that the foregoing preferred embodiments have been shown and described for the purposes of illustrating the structural and functional principles of the present invention and are subject to change without departure from such principles. Therefore, this invention includes all modifications encompassed within the spirit and scope of the following claims.

We claim:

1. A pad assembly for an air bag device which is disposed on a steering wheel, said pad assembly comprising:

an upper wall and a side wall extending downwardly from a peripheral edge of said upper wall, a covering layer made of a synthetic resin;

a rigid insert embedded in said side wall; and a pressure sensitive switch having metal sheets which have a shape-retaining property, said metal sheets cooperating to function as a horn switch, said pressure sensitive switch being disposed on a rear surface of the upper wall with an end portion of said pressure sensitive switch being retained by said rigid insert, said metal sheets being vertically stacked, a lower sheet of said stacked metal sheets having a plurality claw pieces formed so as to extend from right and left edges thereof in a horizontal direction, said claw pieces being retained to an upper portion of a mounting piece extending downwardly from an inner periphery of said insert.

2. A pad assembly for an air bag device according to claim 1, wherein said end portion of the pressure sensitive switch includes tongue pieces extending from each of the metal sheets so that each said tongue piece is offset with respect to another said tongue piece, said tongue pieces being retained at end portions thereof to said insert by means of rivets.

3. A pad assembly for an air bag device according to claim 1, wherein said end portion of the pressure sensitive switch is retained to a mounting piece extending downward from the insert in an inner periphery thereof by means of rivets together with a holder for holding an air bag, and an inflater of the air bag device.

4. A pad assembly for an air bag device according to claim 1, wherein said rear surface of said upper wall in which said pressure sensitive switch is disposed includes a plurality of recessed grooves formed so as to extend in alignment in a lateral direction of the pad assembly.

5. A pad assembly for an air bag device according to claim 1, wherein said metal sheets include a lower sheet, a middle sheet and an upper sheet in a vertically stacked arrangement, said upper and lower sheet being made of stainless steel, and said middle sheet being made of copper.

6. A pad assembly for an air bag device according to claim 1, wherein said pressure sensitive switch includes a plurality of metal sheets having a shape adapted to fit into a recessed portion of said upper wall and including supporting portions made of rubber and disposed between the sheets.

7. A pad assembly for an air bag device according to claim 6, wherein said supporting portions disposed in each space between said metal sheets are offset from each other so that the supporting portion in one space is not disposed on top of that in another space.

* * * * *